(12) United States Patent
Nelson et al.

(10) Patent No.: US 7,214,016 B2
(45) Date of Patent: May 8, 2007

(54) BULKHEAD AND PARTITION SYSTEMS

(75) Inventors: Chad Nelson, Rice Lake, WI (US);
Roger Nelson, Rice Lake, WI (US);
Matt Nelson, Cameron, WI (US)

(73) Assignee: FG Products, Inc., Rice Lake, WI (US)

( * ) Notice: Subject to any disclaimer, the term of this patent is extended or adjusted under 35 U.S.C. 154(b) by 96 days.

(21) Appl. No.: 11/071,601

(22) Filed: Mar. 3, 2005

(65) Prior Publication Data

US 2005/0207859 A1    Sep. 22, 2005

Related U.S. Application Data

(62) Division of application No. 10/040,091, filed on Oct. 19, 2001, now Pat. No. 6,877,940.

(60) Provisional application No. 60/241,693, filed on Oct. 19, 2000, provisional application No. 60/269,436, filed on Feb. 16, 2001, provisional application No. 60/296,623, filed on Jun. 7, 2001.

(51) Int. Cl.
*B60P 7/08*    (2006.01)

(52) U.S. Cl. ............... 410/129; 410/121; 410/140; 296/24.41

(58) Field of Classification Search ........... 410/121, 410/129, 130, 140; 296/24.41; 52/309.15, 52/630, 794.1; 220/529, 553; 160/40, 215
See application file for complete search history.

(56) References Cited

U.S. PATENT DOCUMENTS

| | | | |
|---|---|---|---|
| 1,896,198 A | 2/1933 | MacMillan |
| 2,238,700 A | 4/1941 | Lundvall |
| 3,033,130 A | 5/1962 | Erickson |
| 3,376,599 A | 4/1968 | Singer |
| 3,680,492 A | 8/1972 | Weage |
| 3,753,843 A | 8/1973 | Hutchison |
| 4,639,031 A | 1/1987 | Truckenbrodt |
| 4,780,034 A | 10/1988 | Skotte |
| 4,880,342 A | 11/1989 | Pradovic |
| 5,010,943 A | 4/1991 | Boyer |
| 5,054,295 A | 10/1991 | Goulooze |
| 5,161,848 A | 11/1992 | Lutton |

(Continued)

OTHER PUBLICATIONS

Beall, *Rotational Molding: Design, Materials, Tooling, and Processing*, Oct. 1998, Hanser/Garner Publications, Inc., Cincinnati (Table of Contents only).

(Continued)

*Primary Examiner*—Stephen Gordon
(74) *Attorney, Agent, or Firm*—Fish & Richardson P.C.

(57) ABSTRACT

Improved panels suitable for use in bulkhead and partition systems. In one embodiment of the invention, the panels are seamless, one-piece members integrally formed from a single resinous material. In other embodiments, the panels include depressions that obviate the need to fill the panels with foam or other supportive filler material. In still other embodiments, the panels have no fasteners extending through panel so the panels are substantially impervious to moisture. Other embodiments have grooves or similar mounting apparatus disposed around their peripheral edges to which edging such as supports or flexible seals may be mounted. In yet other embodiments, the grooves are arranged so as to permit worn out seals to be quickly and easily replaced without the need to remove mechanical fasteners.

20 Claims, 15 Drawing Sheets

U.S. PATENT DOCUMENTS

| | | |
|---|---|---|
| 5,664,386 A | 9/1997 | Palmersten |
| 5,704,676 A | 1/1998 | Hill |
| 5,807,046 A | 9/1998 | Onken |
| 5,984,601 A | 11/1999 | Jevaney et al. |
| 6,514,022 B2 | 2/2003 | Truckor et al. |
| 6,877,940 B2 * | 4/2005 | Nelson et al. .............. 410/129 |
| 6,923,610 B2 * | 8/2005 | Nelson et al. .............. 410/130 |

OTHER PUBLICATIONS

Crawford (ed.), *Rotational Moulding of Plastics*, Second Edition, 1996, John Wiley & Sons Inc., New York (Table of Contents only).

Knights, "The Next Generation of Rotomolding," *Plastics Technology*, 2001, 47(5):62-67.

Schwartz and Goodman, *Plastics Materials and Processes*, 1982, Van Nostrand Reinhold Company, New York (Table of Contents only).

Trade Literature describing Randall Bulkhead Systems believed to have been offered for sale prior to Oct. 19, 2000.

Trade Literature describing Tempar Bulkhead Systems believed to have been offered for sale prior to Oct. 19, 2000.

Trade Literature describing ROM Bulkhead Systems believed to have been offered for sale prior to Oct. 19, 2000.

Trade Literature describing Bulkhead Seals on Todco bulkhead doors believed to have been offered for sale prior to Oct. 19, 2000.

Trade Literature describing Donovan Bulkhead Systems believed to have offered for sale prior to Oct. 19, 2000.

Trade Literature describing FG Products Bulkhead Systems believed to have been offered for sale prior to Oct. 19, 2000.

* cited by examiner

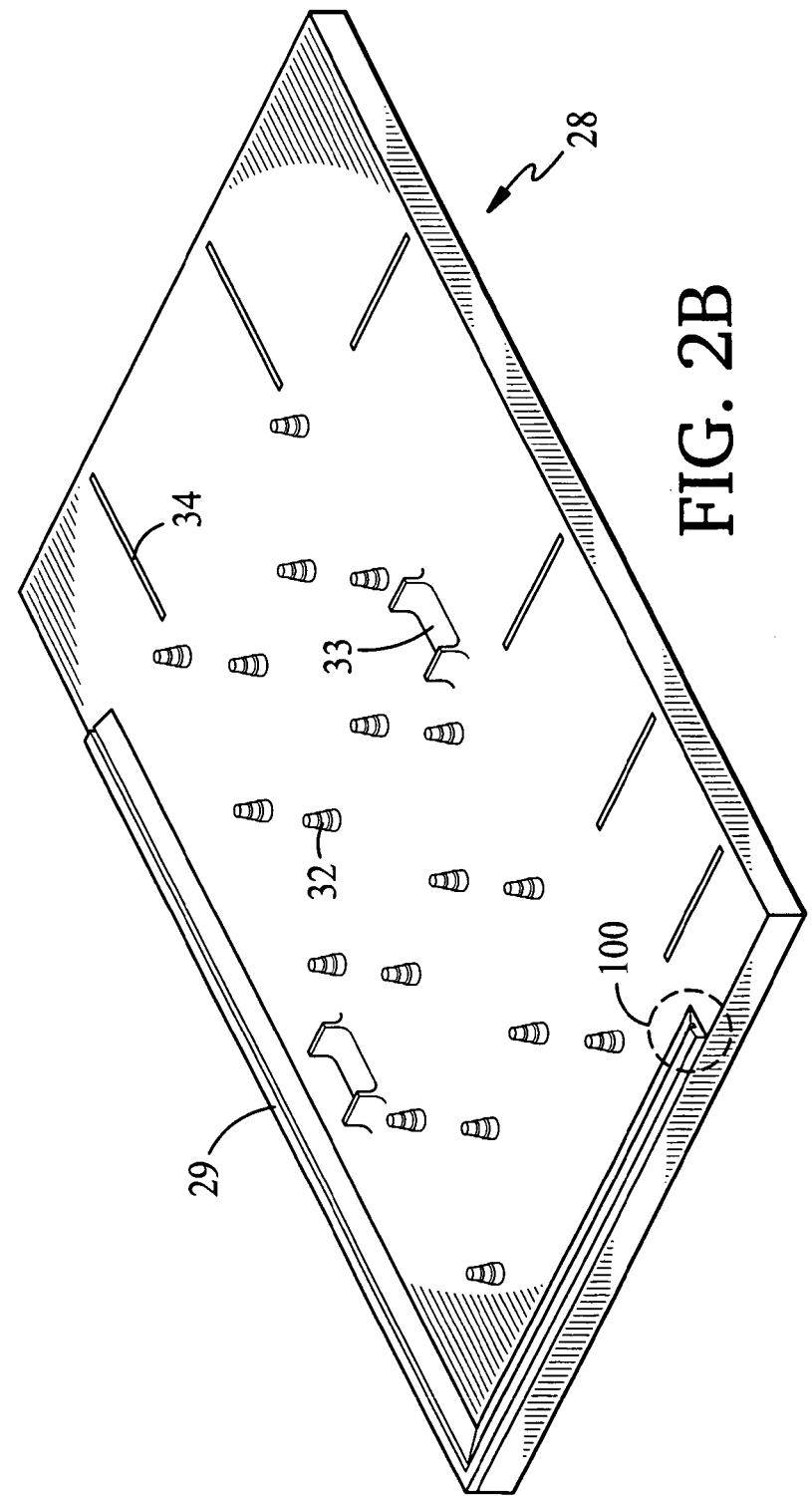

BULKHEAD AND PARTITION SYSTEMS

CROSS REFERENCE TO RELATED APPLICATIONS

This application is a divisional application of Ser. No. 10/040,091 (and claims the benefit of priority under 35 U.S.C. § 120), entitled "Bulkhead and Partition Systems," filed Oct. 19, 2001 now U.S. Pat. No. 6,877,940, which claims benefit to the following U.S. provisional applications: Ser. No. 60/241,693, entitled "Bulkhead And Partition System," filed Oct. 19, 2000; Ser. No. 60/269,436, entitled "Bulkhead And Partition System And Methods And Apparatus For Molding Plastic Parts," filed Feb. 16, 2001; and Ser. No. 60/296,623, entitled "Bulkhead And Partition System And Methods And Apparatus For Molding Plastic Parts," filed Jun. 7, 2001. The disclosure of the prior applications is incorporated herein by reference in its entirety.

TECHNICAL FIELD

The present invention relates to panels that can be used to separate or insulate cargo during transportation or storage, including partitions and bulkheads.

BACKGROUND

Perishable items such as produce and meat are often transported in refrigerated trailers, railcars, or ocean-going containers that can be transported on ships, trains or trucks. Such cargo transport devices are typically equipped with a refrigeration unit that conditions the air inside the cargo space, thereby maintaining desired temperatures and humidities during transportation or storage. Refrigerated trailers, railcars and containers are typically configured so as to enclose a single, large cargo space. Their refrigeration units will accordingly maintain the entire cargo space at the same temperature and humidity unless the cargo area is somehow divided. However, when the perishable cargo does not fill the entire trailer, cooling the entire cargo area is unnecessary and costly. It causes unnecessary strain and wear on the refrigeration unit, increases fuel consumption, raises transportation costs, and lengthens the time necessary to cool the perishable cargo after any temperature aberration.

Movable panels having a specialized construction permit the cargo space of trailers, rail cars, and containers to be readily divided into sections of varying sizes. Such panels are commonly referred to as "partitions" or "bulkheads," depending on the manner in which they are installed in a cargo space. The structure and configuration of partition and bulkhead systems also vary depending on whether they are being deployed in a trailer, railcar, or container.

Partitions currently used in refrigerated truck trailers typically extend from floor to ceiling and are generally comprised of modular sections akin to cubicle walls commonly used in office spaces. The modular sections are often mounted in channels or grooves on the trailer floor, held in place by friction, hinged to the trailer ceiling, or otherwise mechanically fastened in place so as to compartmentalize trailers and truck bodies for multi-temperature food distribution. The panels are used to divide the trailer or body both longitudinally, along the long axis of the trailer, and laterally, across the width of the trailer. Some partition systems include panels which can be readily removed and placed along the sidewall of the trailer when not in use.

Bulkheads typically have a similar construction but extend across the width of a trailer to form separate fore and aft cargo areas. Like partitions, insulated bulkheads allow a refrigerated hauler to carry two or more loads at different temperatures within the same trailer or cargo container. For instance, bulkheads may be used to separate fresh food products from frozen or dry goods. Bulkheads can be formed of one integral unit or a plurality of sections that are hinged, attached, or interlocking. The individual sections are typically movable by virtue of being releasably mounted on channels, tracks, hinges or the like. When installed in a desired configuration, the sections are often frictionally fit, hinged or otherwise fastened to trailer wall, floor or ceiling. Bulkheads are optionally equipped with walk-through doors similar to those used in partitions to permit ingress to and egress from each conditioned cargo area.

SUMMARY

The present invention is directed to improved panels and bulkhead and partition systems. In one embodiment of the invention, the panels are seamless, one-piece members integrally formed from a single resinous material such as a thermoplastic polymer. In certain embodiments, the panels include depressions that obviate the need to fill the panels with foam or other supportive filler material. In still other embodiments, the panels have no fasteners extending through panel so the panels are substantially impervious to moisture. Other embodiments have grooves or similar mounting means disposed around their peripheral edges to which edge members such as supports or flexible seals may be mounted. In yet other embodiments, the grooves are arranged so as to permit worn out seals to be quickly and easily replaced without the need to remove mechanical fasteners. In a further embodiment, the panels include integrally formed handle structures. In another embodiment, the panels have additional depressions or ribs which promote air flow past adjacent cargo and provide additional rigidity and strength.

The details of these and other embodiments of the invention are set forth in the description below. Other features, objects, and advantages of the invention will be apparent from the description, and from the claims.

BRIEF DESCRIPTION OF THE DRAWINGS

FIG. 2A is a cross sectional view of the bottom half of the two-piece mold;

FIG. 2B is a partial perspective view of the mold of FIG. 2;

Like reference numbers and designations in the various drawings indicate like elements.

DETAILED DESCRIPTION OF THE PREFERRED EMBODIMENTS

Figure 1:
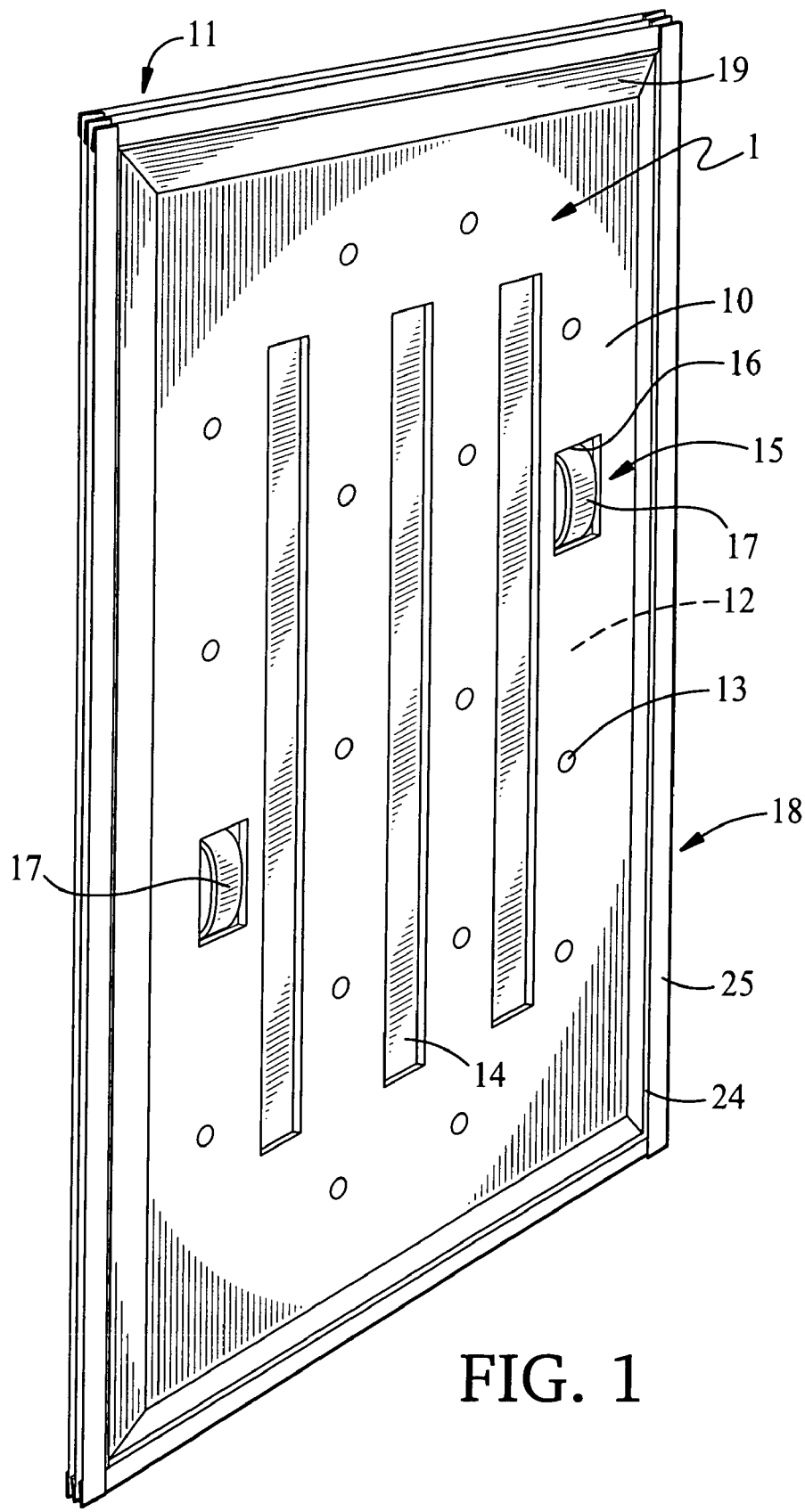
FIG. 1 is a perspective view of an assembled partition with seal strips and nylon handles.

FIG. 1 shows one embodiment of a complete, assembled partition panel 1 constructed in accordance with the present invention. The panel includes a front face 10 and opposed rear face 11 which are held in generally parallel relation and define a cavity 12 therebetween (shown in FIG. 2.). Each of the front face 10 and rear face 11 have depressions or "stand-offs" 13 formed therein which extend across substantially the entire cavity. The faces 10, 11 also may have integral longitudinal ribbing 14 which adds rigidity and permits cool air to flow between the faces 10, 11 and adjacently disposed cargo. Handle formations 15 are integrally molded into the faces 10, 11. The handle formations 15 include arcuate channels 16 that extend from the front face 10 to the rear face 11 and accommodate handles such as nylon straps 17. The panel of FIG. 1 may be fitted with edge members 18 that include wipe-type seals 25 similar to triple-blade windshield wipers.

In use, the panel can be mounted in a refrigerated trailer such that its faces 10, 11 extend laterally across the width of the trailer in the manner depicted in the publication Insulated Bulkheads by FG Products, Inc. of Rice Lake, Wis., which is contained in the cross-referenced applications. The panel may be fitted with appropriate edge members so that the bulkhead can be effectively held in place by tracks in the trailer floors, walls, or ceiling. Alternatively, the panel may be hinged to overhead track systems or mounted in other manners known in the art.

As shown in the publication Center Partition Systems—Designed for Positive Temperature Control, also by FG Products, Inc. of Rice Lake, Wis., (also contained in the cross-referenced applications), the panel of FIG. 1 can be readily adapted for use in a partition system. Suitable mounting and sealing means are used in place of edge members 18 and, if desired, mounting formations adapted to receive additional nylon straps may be molded into the faces 10, 11. A door or portal may also be incorporated into the structure of FIG. 1 to permit rapid ingress and egress from the enclosed cargo area. Those of skill in the art will readily appreciate that other modifications can be made to the bulkhead of FIG. 1 to further adapt it for use as a partition, including but not limited to incorporation of those features described in the publication Center Partition Systems.

Figure 1A:
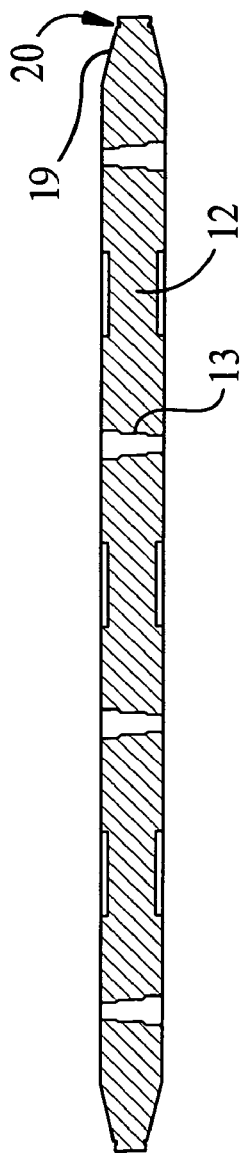
FIG. 1A is a cross sectional view of the panel taken along a horizontal line.
Figure 1B:
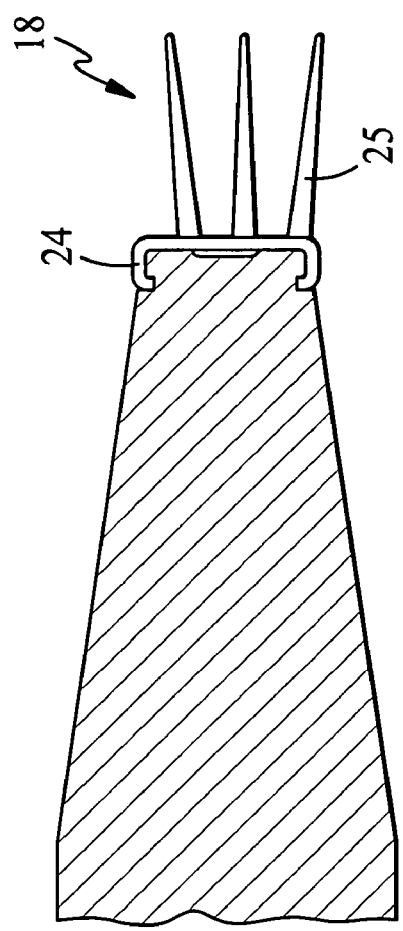
FIG. 1B is a cross sectional view of an edge of the panel and the seal mounted thereto.

The core of the bulkhead is shown in more detail in FIGS. 1A and 1B. As shown in FIG. 1A, the depressions 13 can extend substantially across the entire width of the cavity 12 so as to maintain the faces 10, 11 in spaced apart relation. The faces 10, 11 are preferably constructed of a lightweight, tough, ductile resinous material such as polyethylene, but those of skill in the art will appreciate that a wide variety of other suitable materials may be used, including but not limited to other poly-α-olefins, composite materials, wood, and metal. The wall thickness is preferably within the range 0.05 inch to 0.5 inch and even more preferably within the range 0.15 inch to 0.35 inches. The left and right distal edges of the faces 10, 11 include tapered or beveled regions 19 and channels 20 adapted to hold edge members 18. The channels 20 and tapered regions 19 may optionally extend around the entire periphery of the panel as shown in FIG. 1.

Figure 1C:
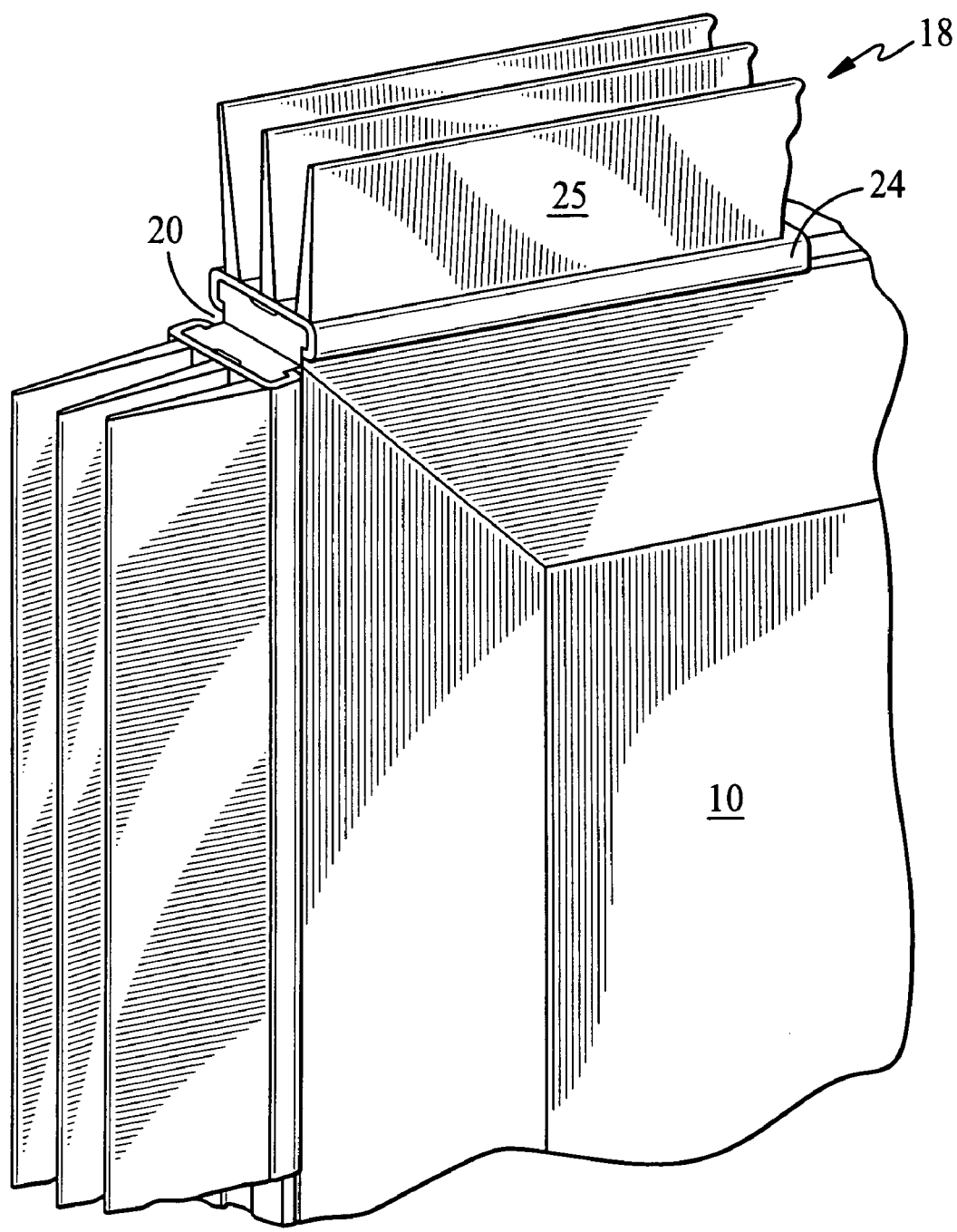
FIG. 1C is a partial perspective view of the upper-left edge of the core panel of FIG. 1, shown with the seals cut away at the corner.

FIG. 1C shows how edge members 18 can be attached to the bulkhead. Mounting member 24 slideably engages the receiving channels 20. Flexible blade- or wipe-type seals 25 extend peripherally from the mounting member 18 so as to contact the adjacent surface, which can be another bulkhead or partition or a trailer wall, floor, or ceiling. FIG. 1B is a cross sectional view showing how mounting member 24 engages the receiving channels and thereby rigidly attaches seal 18 to the panel.

Figure 2:
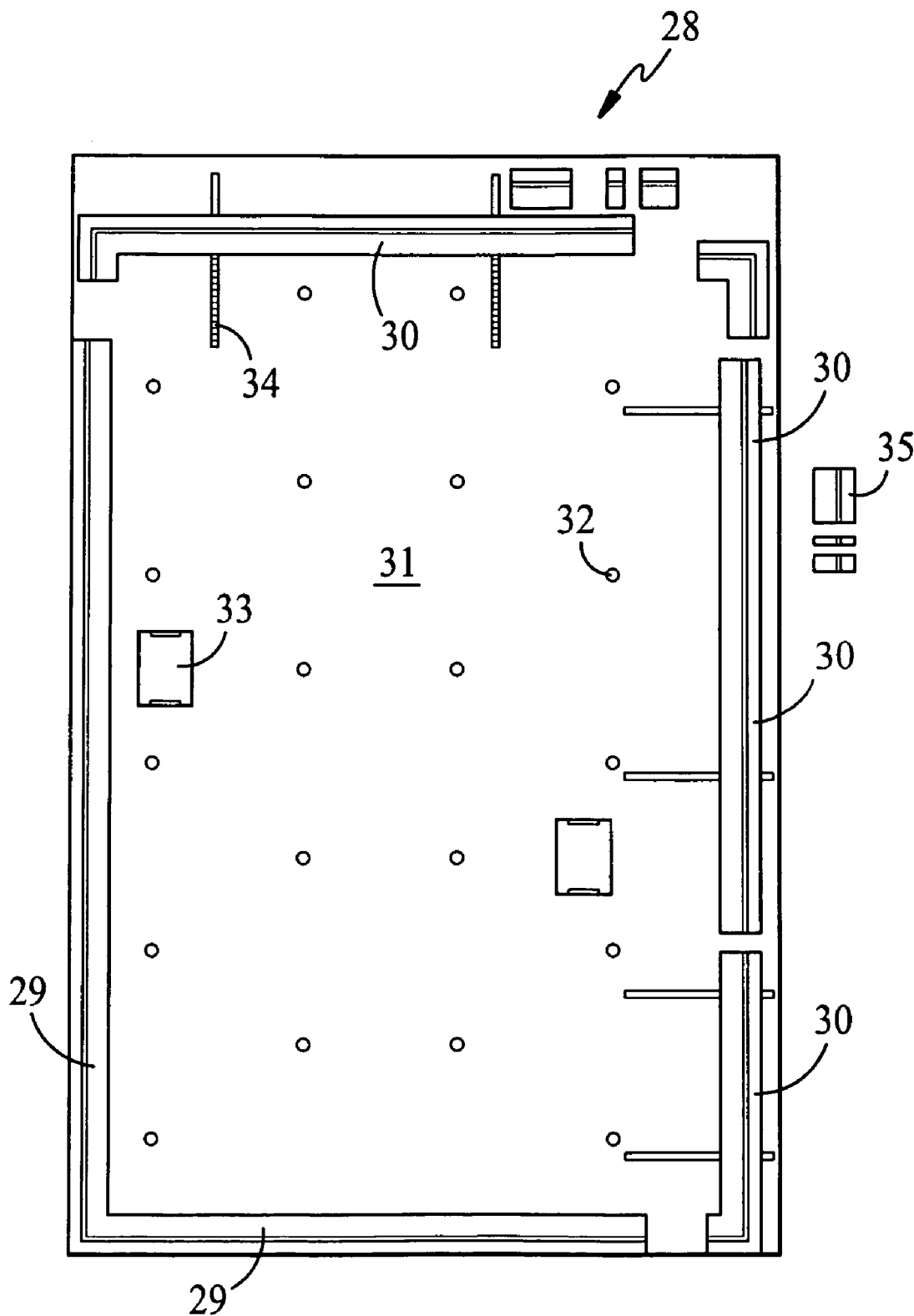
FIG. 2 is a plan view of the bottom half of a two-piece adjustable mold with which the panel of FIG. 1 may be manufactured.

The aforementioned bulkheads and partitions may be manufactured in customized dimensions and configurations with an adjustable mold such as that depicted in FIGS. 2–6. FIG. 2 is a plan view of a first adjustable mold 28 for use in apparatus for thermoforming, such as vacuum forming, and rotational molding. Fixed rails 29 are disposed along the bottom and left edge of the mold area 31. Adjustable rails 30 are disposed at the right and upper regions of the mold area 31. As more clearly shown in FIG. 2B, stand-off forms 32 and handle forms 33 project vertically from the mold 28. Returning to FIG. 2, the adjustable rails 30 are mounted on tracks 34 which may be disposed below, inside, or outside the adjustable rails 30. The adjustable rails 30 are mechanically engaged with the tracks 34 with fasteners, pins, clamps, or other known means so as to permit the rails to be moved toward or away from the center of the mold area 31. Rail inserts 35 are adapted to engage the adjustable rails 30 and fixed rails 29 in flush relation, as with pins, bolts, clamps or other known means.

In an alternate embodiment, the fixed rails 29 may extend the entire height and width of the mold area 31. The right adjustable rail 30 is comprised of a single member that extends from the bottom fixed rail 29 to the top of the mold area 31. The bottom of the right adjustable rail 30 is "coped" to the bottom fixed rail 29 like a baseboard so as to form a symmetrical seam and corner region. The upper adjustable rail 30 extends between the left fixed rail 29 and the right adjustable rail 30 and is coped thereto. Upper adjustable rails 30 are provided in varying widths. That construction obviates the need for rail inserts 35. The adjustable rails 30 are manipulated by articulation of a cooperating track and mounting member disposed entirely outside the mold area 31 so that no portion of the track 34 has to be filled to prevent aberrations in the face portions 10, 11.

A wide variety of adjustable rail systems may be employed. Each face 10, 11 can be vacuum-formed separately using a mold having a similar array of adjustable members, whereafter the formed panels 10, 11 may be attached to one another according to known methods. Likewise, the adjustable mold members need not be slideably attached to rails or tracks—rather, they may be adjustably fastened directly to the mold 28, 36 with pins, bolts, clamps or other suitable means. Those skilled in the art will appreciate that myriad other modifications may be readily made to the above described adjustable molding apparatus so as to optimize its performance in a particular application.

Figure 3:
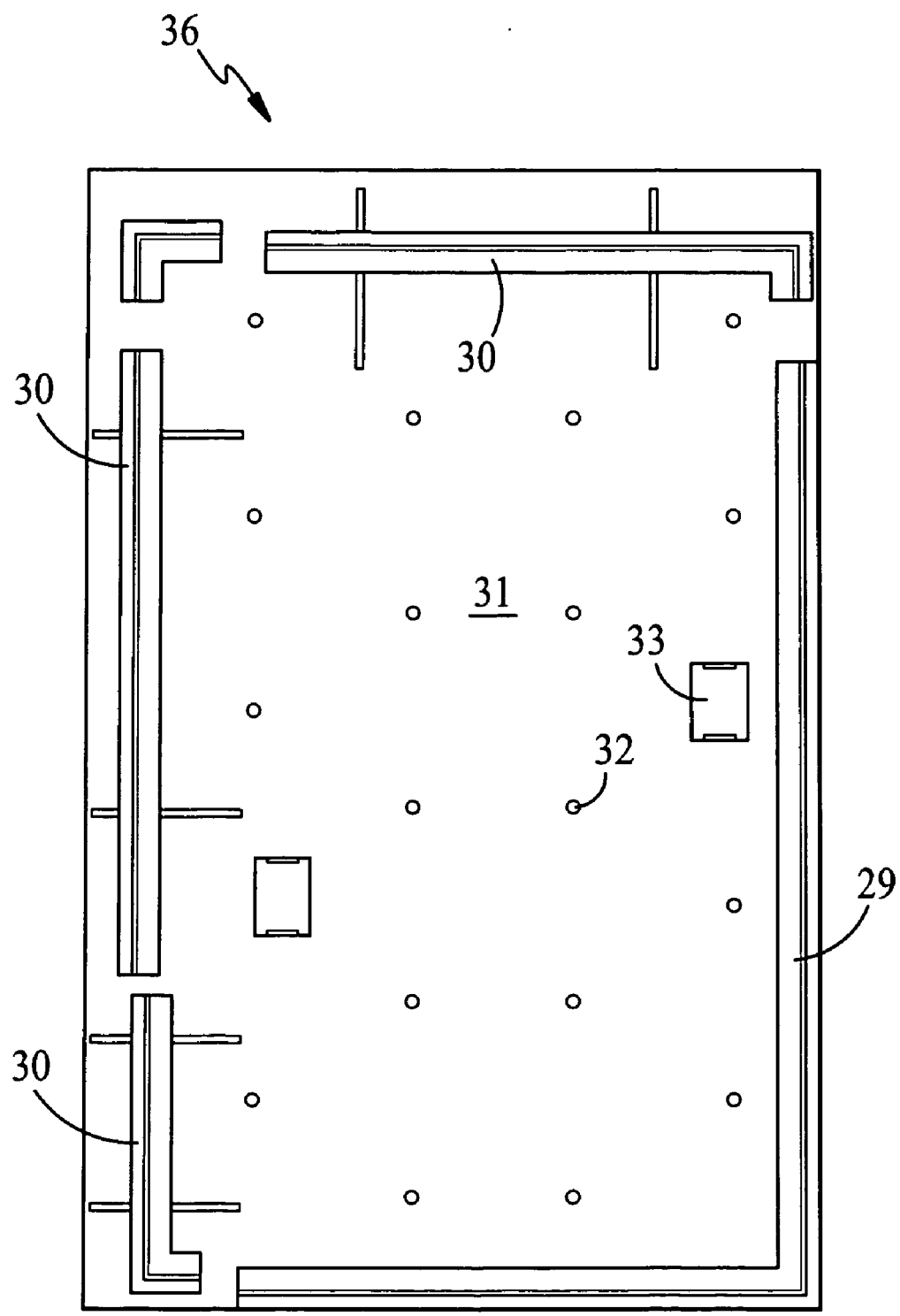
FIG. 3 is a plan view of the complementary top half of the mold of FIG. 2.
Figure 3A:
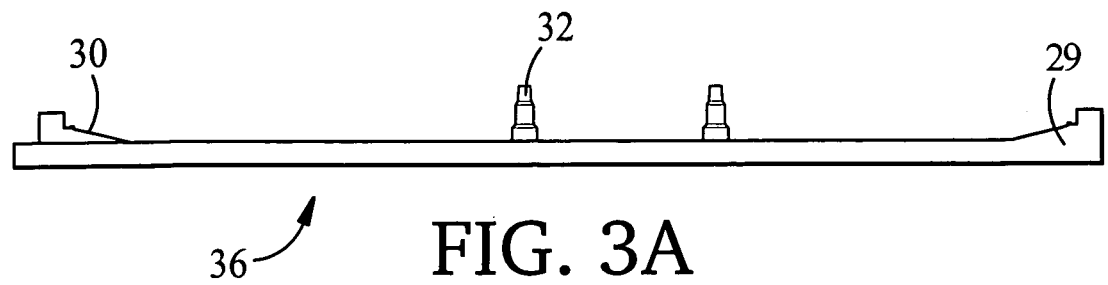
FIG. 3A is a cross sectional view of the top half of the two-piece mold.
Figure 3B:
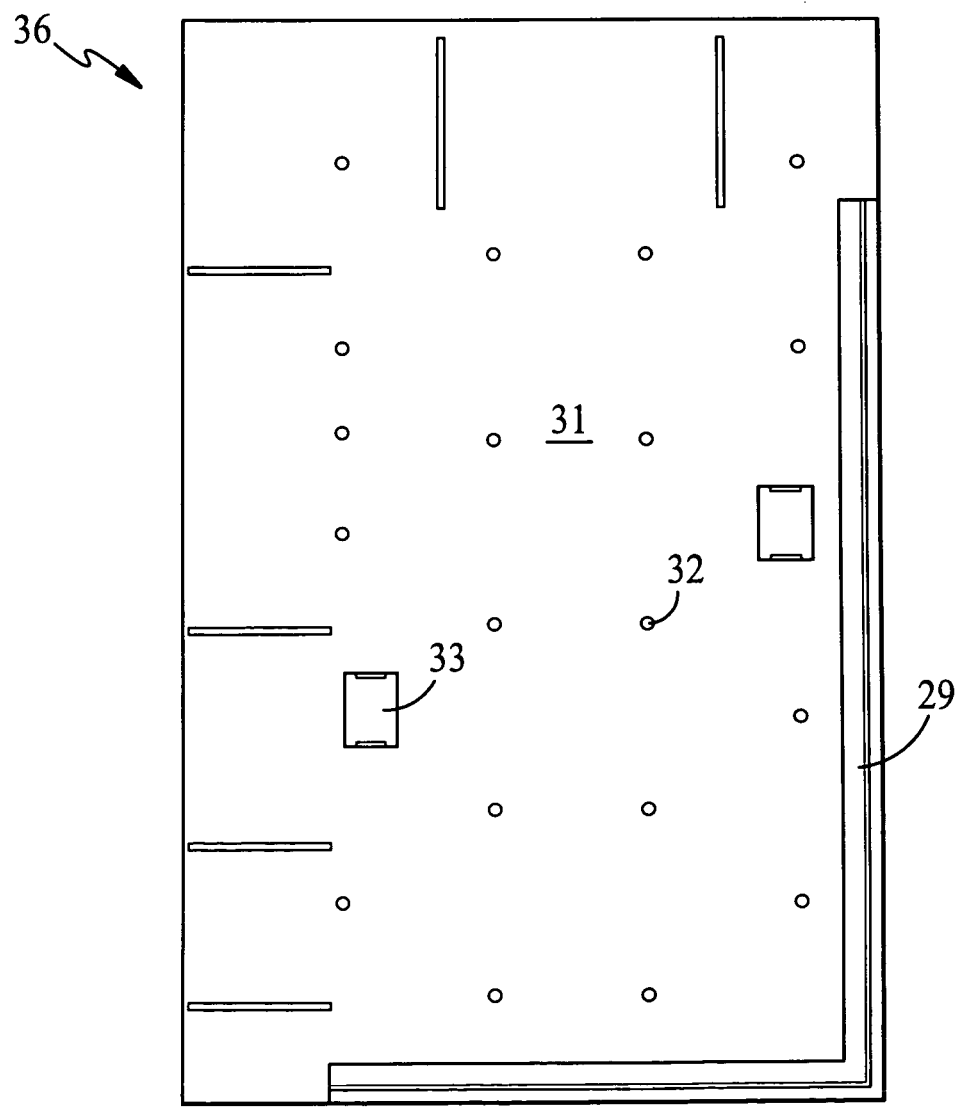
FIG. 3B is a plan view of the mold of FIG. 3 after the adjustable rails have been removed.
Figure 4:
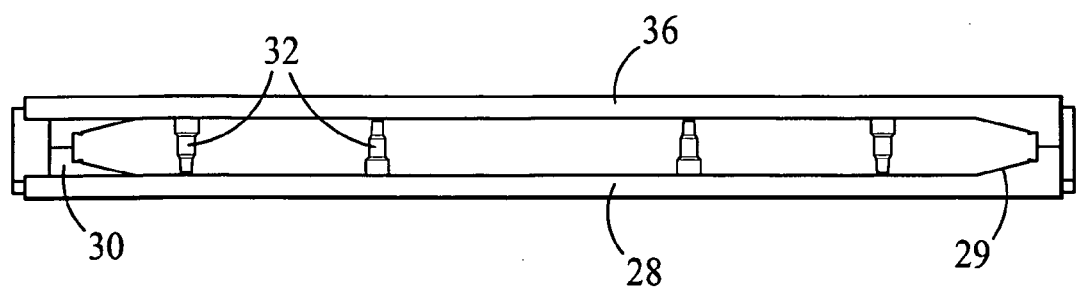
FIG. 4 is a cross sectional view of the bottom and top halves of the closed two-piece mold.

In use, the fabricator manipulates the adjustable rails 30 to the desired dimensions on the first mold 28 and a second, complementary mold 36 shown in FIG. 3. The molds are then closed together as shown in the cross section views of FIG. 4. The foregoing operations can occur either before or after the mold is placed into a conventional thermoforming apparatus such as a vacuum forming device or a rotomolder. When rotational molding is employed, it may be advantageous to counterweight the molds 28, 36 50 that the center of gravity of the closed mold assembly is disposed along the axis about which the mold is spun.

Figure 5:
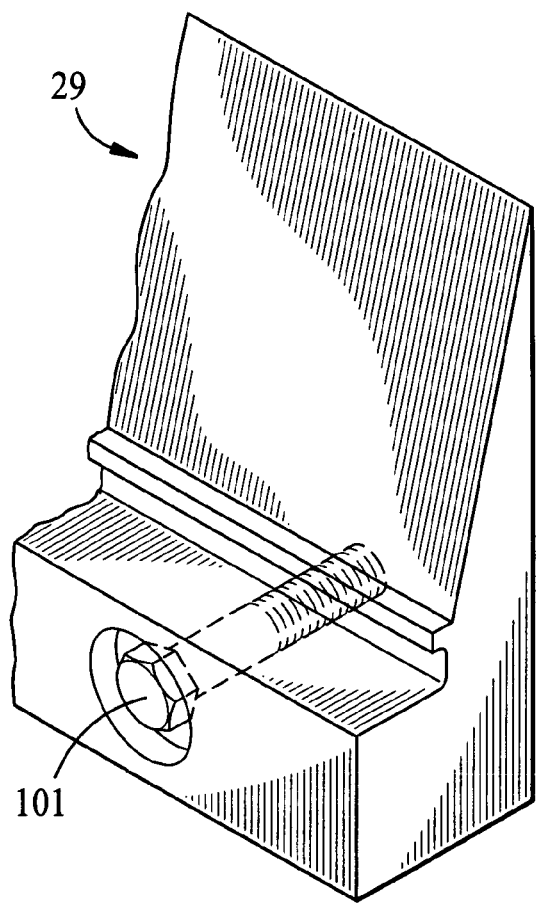
FIG. 5 is a partial perspective view of the end of the rail member shown in FIG. 2B.

FIG. 5 is a close-up view of portion 100 of the mold shown in FIG. 2B. The fixed rail 29 is bolted to the mold half 28 with a threaded fastener 101. The cross-sectional contour of the rail member 29 matches the contour of the peripheral portions of the molded panel 1 and the seal mounting members 24.

Figure 6:
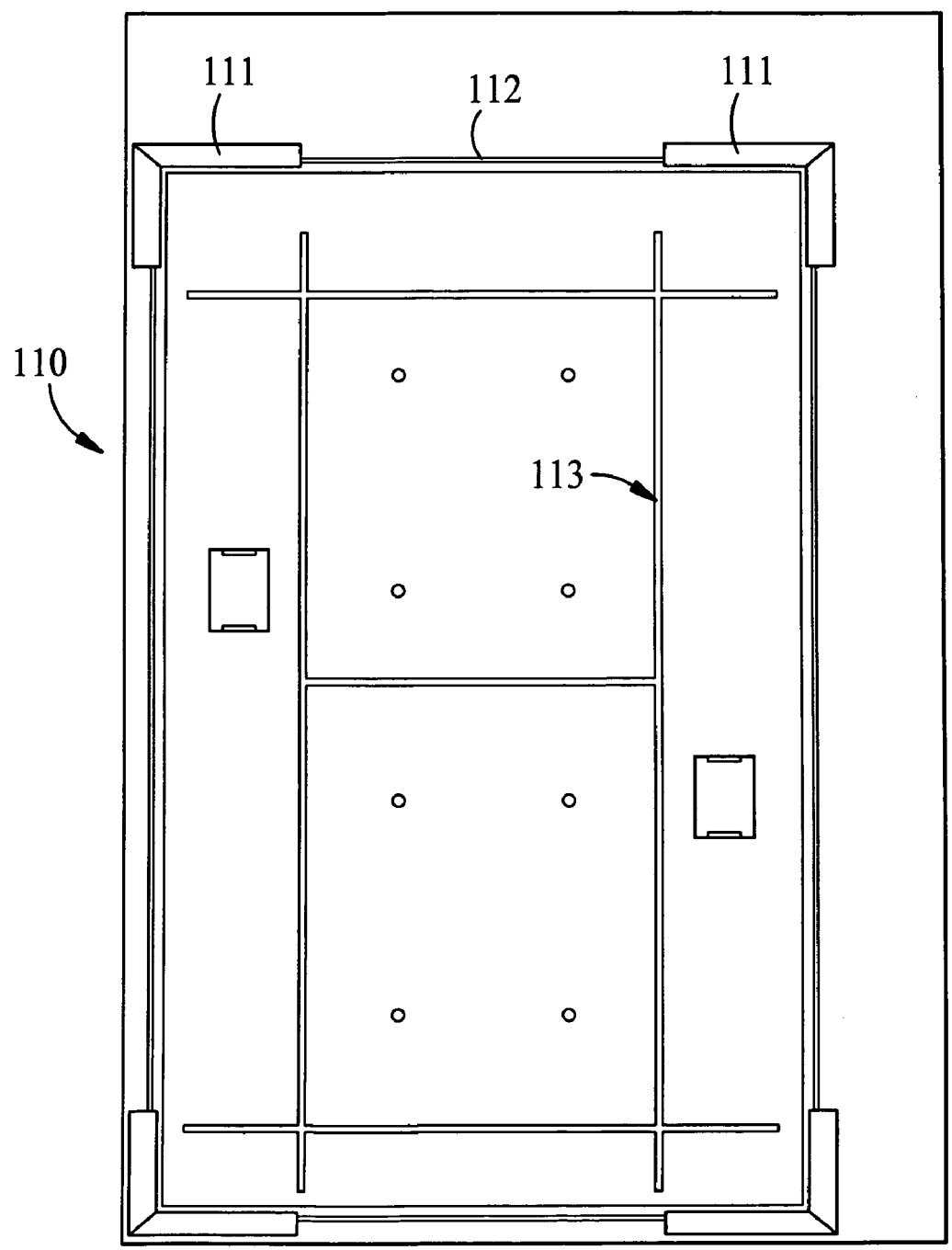
FIG. 6 is a plan view of the complementary top half of an alternate mold.
Figure 6A:
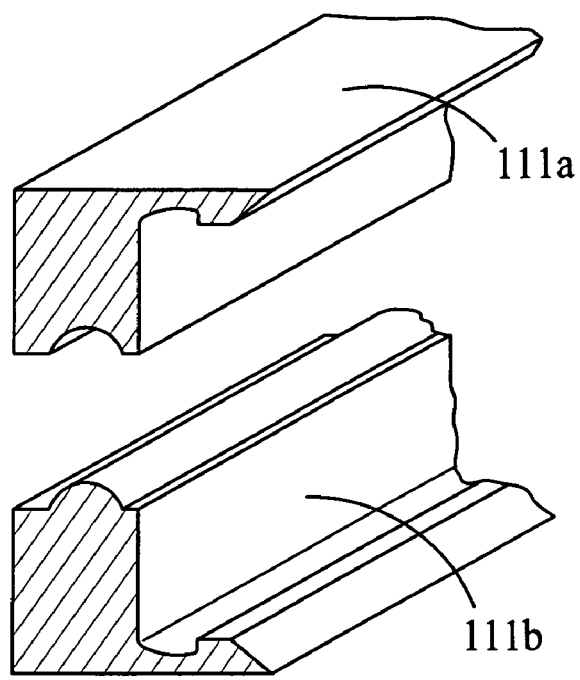
FIG. 6A is a cross sectional view of the rail members shown in FIG. 6.
Figure 6B:
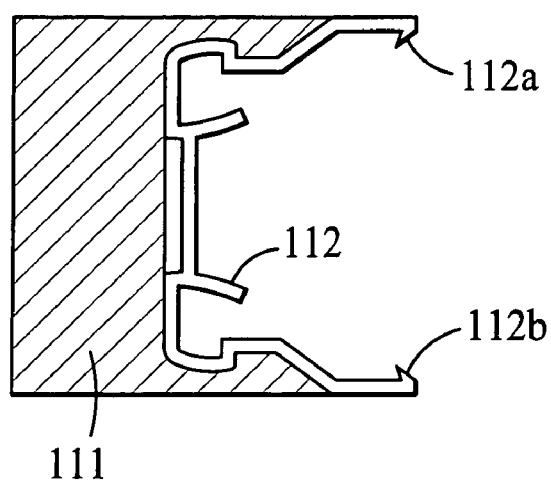
FIG. 6B is a metal edge member mounted in the rail members shown in FIG. 6A.

FIG. 6 depicts a alternate mold half 110. Adjustable rail members 111 are installed in the mold cavity. Trim members 112 span the cavity between rail member 111 and define the mold area in which the resin can be deposited. Ridge elements 113 are disposed longitudinally and latitudinally in the mold cavity so as to cause the formation of ridges or depressions in the final molded panel that accommodate expansion or shrinkage of the panel faces. After rotomolding is complete, trim members 112 form the outer edges of the panel. FIG. 6A is a close-up view of matable rail members 111a and 111b which clamp down upon trim members 112 and hold them in place. FIG. 6B is a cross sectional view of the matable rail members 111a and 111b after a trim member 112 has been installed therein. After the mold halves are closed together, the upper flange 112a and lower flange 112b fit flush against the faces of the mold halves and thereby, in cooperation with the mold half faces, define a mold cavity.

Figure 7:
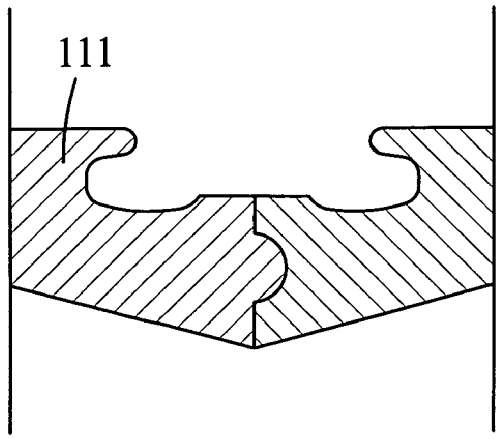
FIGS. 7 through 7C are a cross sectional views of rail members for use in the molds of FIGS. 2–6.
Figure 7A:
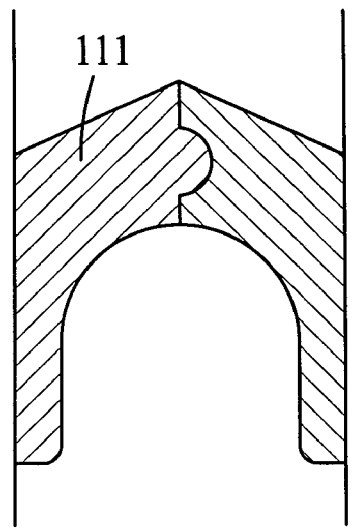
Figure 7B:
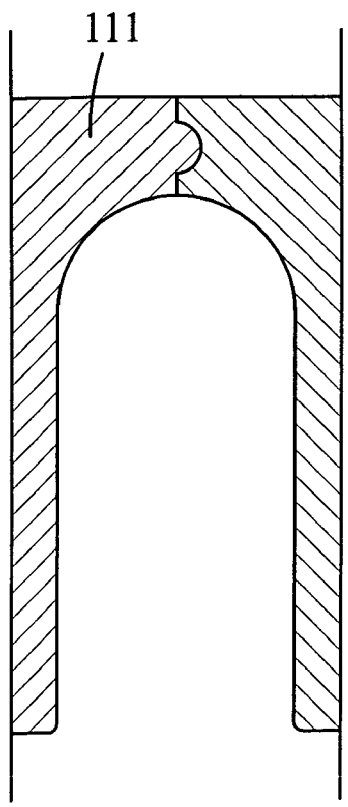
Figure 7C:
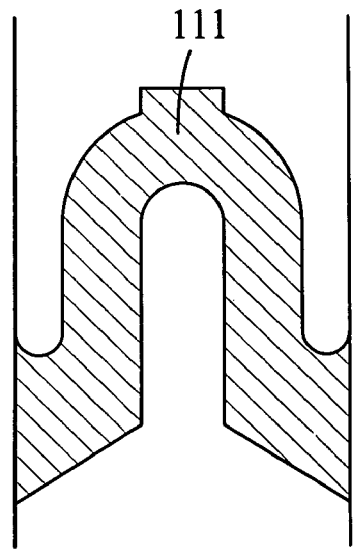

FIGS. 7 through 7C show alternate mold edge members 111 adapted to form contours of various shapes in the bulkhead. The mold edges 111 form an edge contour adapted to receive the wipe seals or other edge members discussed above. The depicted members 111 can be used in place of the members 111 shown in FIG. 6A. Optionally, a rigid trim member made of metal or other suitable material can be inserted in the interior of the mold edge members so as cause the rigid trim member to be integrally molded into the bulkhead as the bulkhead's peripheral edge as described above in connection with FIG. 6. The mold edge members 111 shown in FIGS. 7A to 7C form arcuate, matable contours into the bulkhead. The bulkhead edge molded by the members 111 of FIG. 7A will mate with a contoured edge formed by the mold element 111 of FIG. 7C.

The panels discussed above can be comprised of polyethylene and glass fibers made by an improved molding technique. Fibers, filaments or other reinforcing structures made of glass, carbon or other suitable materials may be molded directly into a base polymer, such as polyethylene, polypropylene, nylon, or polycarbonate. The fibers in the resulting parts can extend through the entire thickness of the material, thereby significantly increasing the part's strength, toughness and structural integrity. Advantageously, the dimensions of the fibers can be varied such that fibers extend into an internal cavity of the part to act as an interface with material placed therein, such as foam. The protruding fibers thus can act to integrally connect and secure the polymeric composite to an adjacently situated foam, resin, polymer, composite, or other material. In certain applications, this is particularly advantageous because the fibers can inhibit the adjacent material from delaminating from an outer shell comprised of a polymeric composite. Filler materials, such as foam, can thus act not only as an insulator, but also as an additional source of rigidity and strength.

The rotational molding process (also called "rotomolding") is initiated by preparing a mold that is suitable to be placed in a rotomolding machine that can include loading, heating, and cooling areas. Depending on the molding machine, multiple molds can be mounted, heated, and cooled simultaneously. A predetermined amount of plastic resin—often in the form of a powder—can be loaded into each mold. The amount of resin can be selected based on the size of the mold and the desired wall thickness. For greater wall thicknesses, an increased amount of resin can be used. A predetermined amount of reinforcing elements such as glass fibers can also added to each mold. The amount of fibers can be selected based upon the desired properties of the resulting composite. A greater volume or weight fraction of fibers can be added where stiffer, stronger parts are desired. Smaller volume or weight fractions of fibers can be added to increase flexibility or to decrease cost, for example.

The molds can then be closed and placed into a heating area of the rotomolding apparatus, which can include an oven. The molds can be slowly rotated as they are heated along both vertical and horizontal axes. As the resin touching the mold softens or melts, it adheres to both the adjacently situated fibers and the wall of the mold. The powder adjacent to the softened resin also softens or melts and then adheres to the resin situated against the wall of the mold and the adjacently situated fibers. The continued rotation of the molds can advantageously cause the resin to coat all surfaces of the inside of the mold to a uniform depth or thickness. Advantageously, the mold can be rotated after the mold is moved into a cooling area so that the depth of the resin adhered to the internal walls of the mold remains constant. The temperatures, rotational rotates, and materials can be selected to control the wall thickness and the additional material thickness (and strength) at the corners of a part. Depending on the thermal expansion and contraction characteristics of the materials selected, the speed of the rotation, and the cooling rate, the parts can separate from the mold during the cooling process. The mold can be opened after the cooling cycle is complete, whereafter the molded part is removed.

The use of reinforcing elements such as fibers advantageously reduces the coefficient of shrinkage and expansion of the resulting part. For instance, a bulkhead or panel molded as described above and filled with polyurethane foam is typically exposed to extreme temperatures. During use in refrigerated transport application or in a refrigerated cooler, the bulkhead is at a very low temperature, such as zero degrees Fahrenheit. At other times, the bulkhead may be exposed to temperatures in excess of one hundred degrees Fahrenheit. The reduced thermal expansion and contraction coefficient of the part tends to further inhibit delamination of the outer composite from the internal foam. As noted above, the protruding fibers also greatly.

Depending on the configuration of the molded part, multiple parts can be molded within a single mold during a single cycle. For instance, two air return bulkheads can be fabricated simultaneously, each bulkhead being formed by an opposite side of a clam shell type mold. If further additional strength is desired, reinforcing ribs can be included in the mold. Optionally, various additives can be added to increase the part's resistance to ultraviolet light, temperature, heat, flame, or electrostatic charge. As noted above, various inserts may be molded into the part, including rims, handles, or edging made of metal or other suitable materials. Moreover, multiple wall molds can be used that include adjacently situated cavities so that a single molding cycle produces multiple parts or pieces.

In a preferred embodiment, the wall thickness is about an eighth of an inch. Glass fibers having a length of about 9/16" are molded into the polyethylene wall. A fraction of the fibers protrude into the internal cavity up to about half and inch, depending on the degree to which they are embedded into the polyethylene. Some of the fibers are completely encapsulated by the polyethylene.

The panels of are preferably fabricated accordingly the following protocol. A commercially available aluminum mold was opened and approximately ten pounds of polyethylene powder was added. On top of powder was placed approximately one pound, or ten weight percent, of glass fibers having an approximate length of 9/16". The mold was then closed, mounted to an arm, and slid into an oven. The mold was rotated at approximately twelve RPM on the horizontal axis and four rpm on the vertical axis. The oven was preheated to about 575 degrees Fahrenheit and the mold was left in the oven for about twenty minutes. Afterwards, the mold was placed at a cooling station for 12–15 minutes. Then the mold was opened and the part was removed from the mold while still warm, about 125 to 150 degrees. While at that approximate temperature, the panel was placed in a foaming press and polyurethane foam injected. The panel was allowed to cool for twenty minutes in foaming press before it was removed.

Panels manufactured according to the this technique have significantly improved structural integrity. When a standard foam-filled panel is crushed or impacted with a significant force, the shell or face of the panel delaminates from the internal foam. In contrast, the shell of the improved panel shows no observable delamination when crushed, due in substantial part to the mechanical interlock caused by the fibers protruding inwardly from the wall layer. The shell is strongly bonded to the foam because a significant fraction of the glass fibers were bonded securely to both the foam and polyethylene.

Further details concerning certain aspects of the aforementioned rotomolding technique can be found in Plastics Materials and Processes, Seymour S. Schwartz and Sidney H. Goodman, Van Nostrand Reinhold Company, Inc. (1982); Rotational Molding of Plastics (Polymer Engineering Series 2), 2d Edition, R. J. Crawford (June 1996); and Rotational Molding: Design, Materials, & Processing, Glen Beal (October 1998); the disclosures of which are herein incorporated by reference in their entirety.

Figure 8:
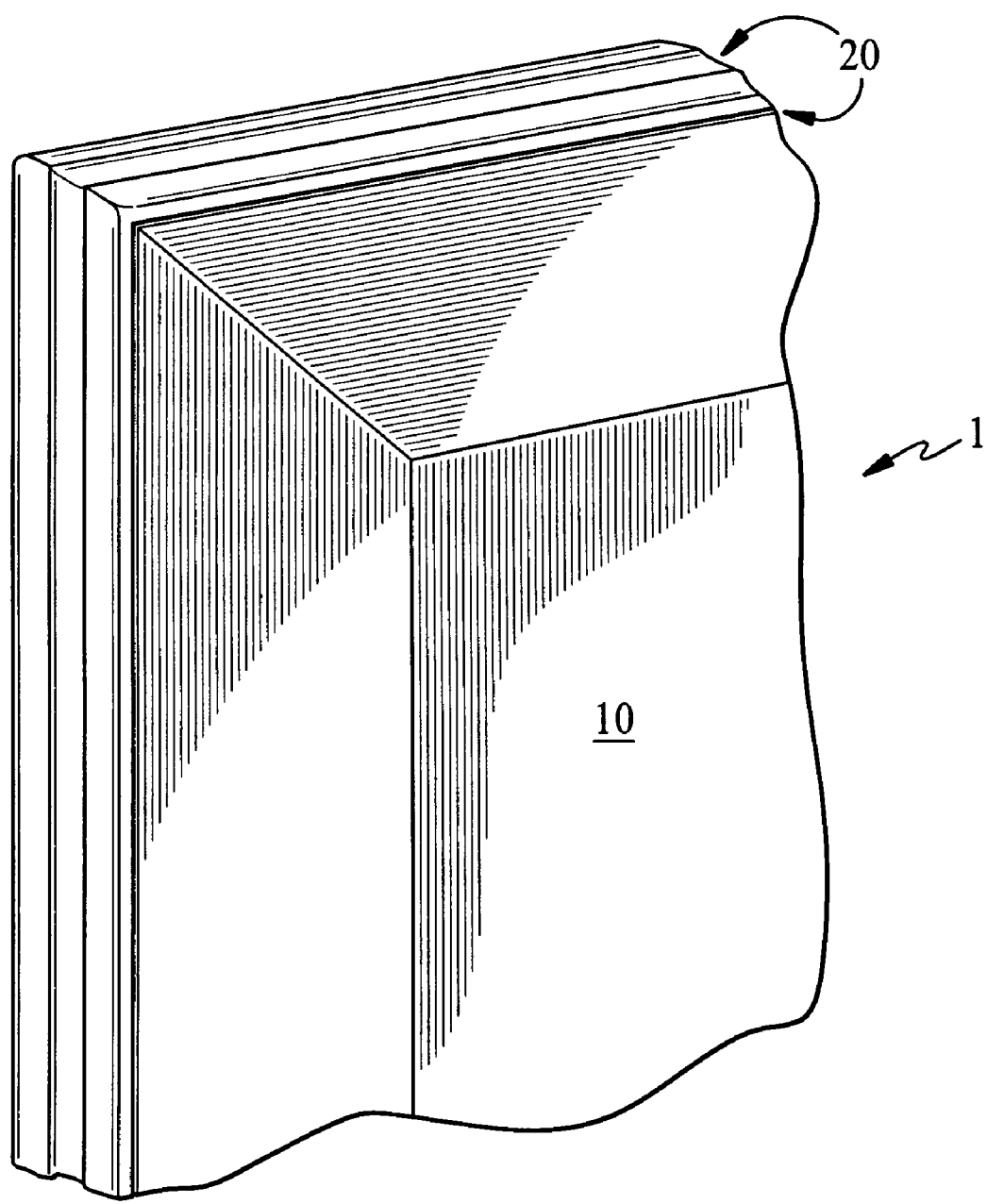
FIG. 8 is a partial perspective view of the upper-left edge of the panel of FIG. 1, shown without the seal members.
Figure 9:
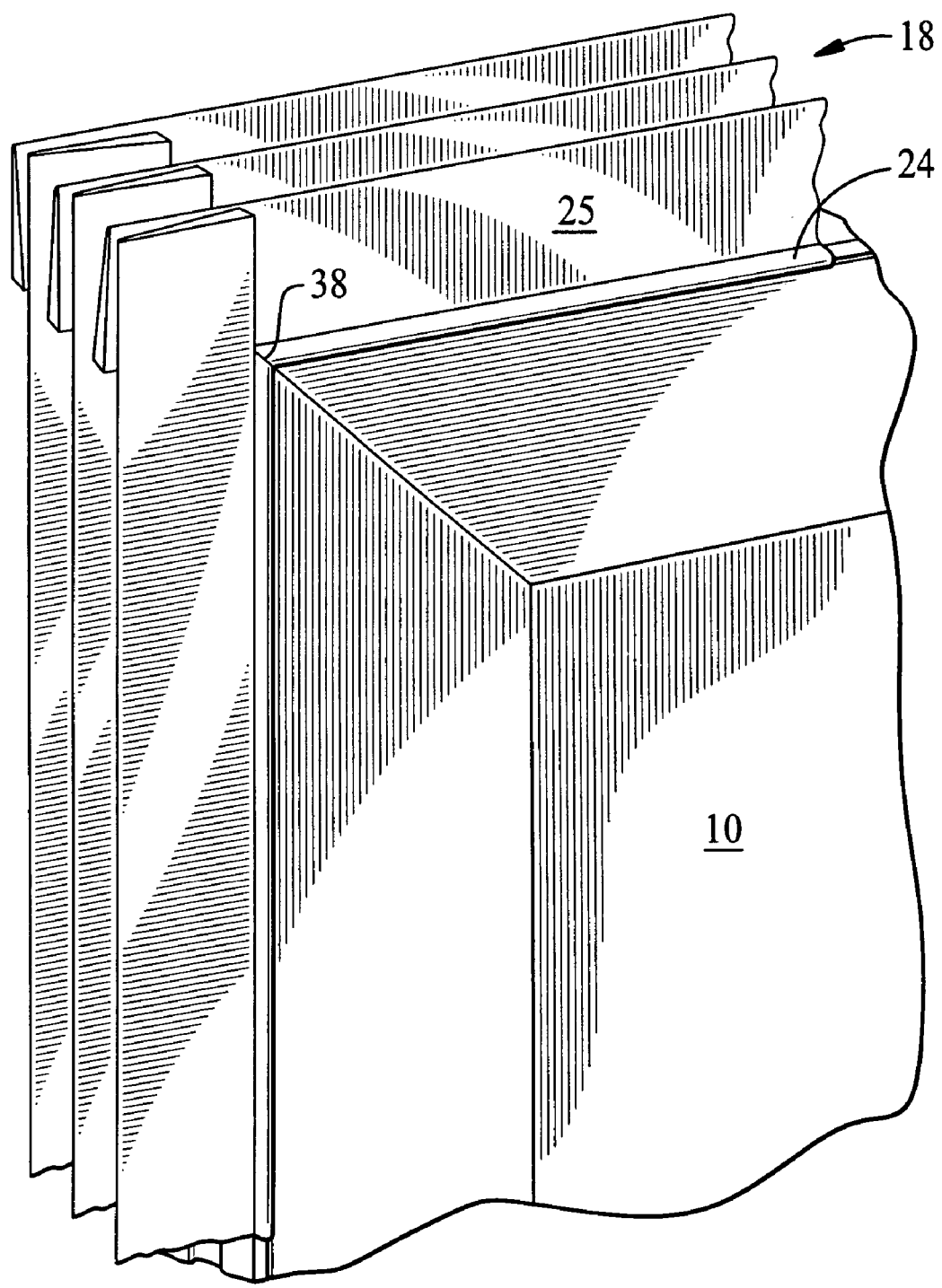
FIG. 9 is a partial perspective view of the upper-left edge of the panel of FIG. 1, shown with the seals.
Figure 10:
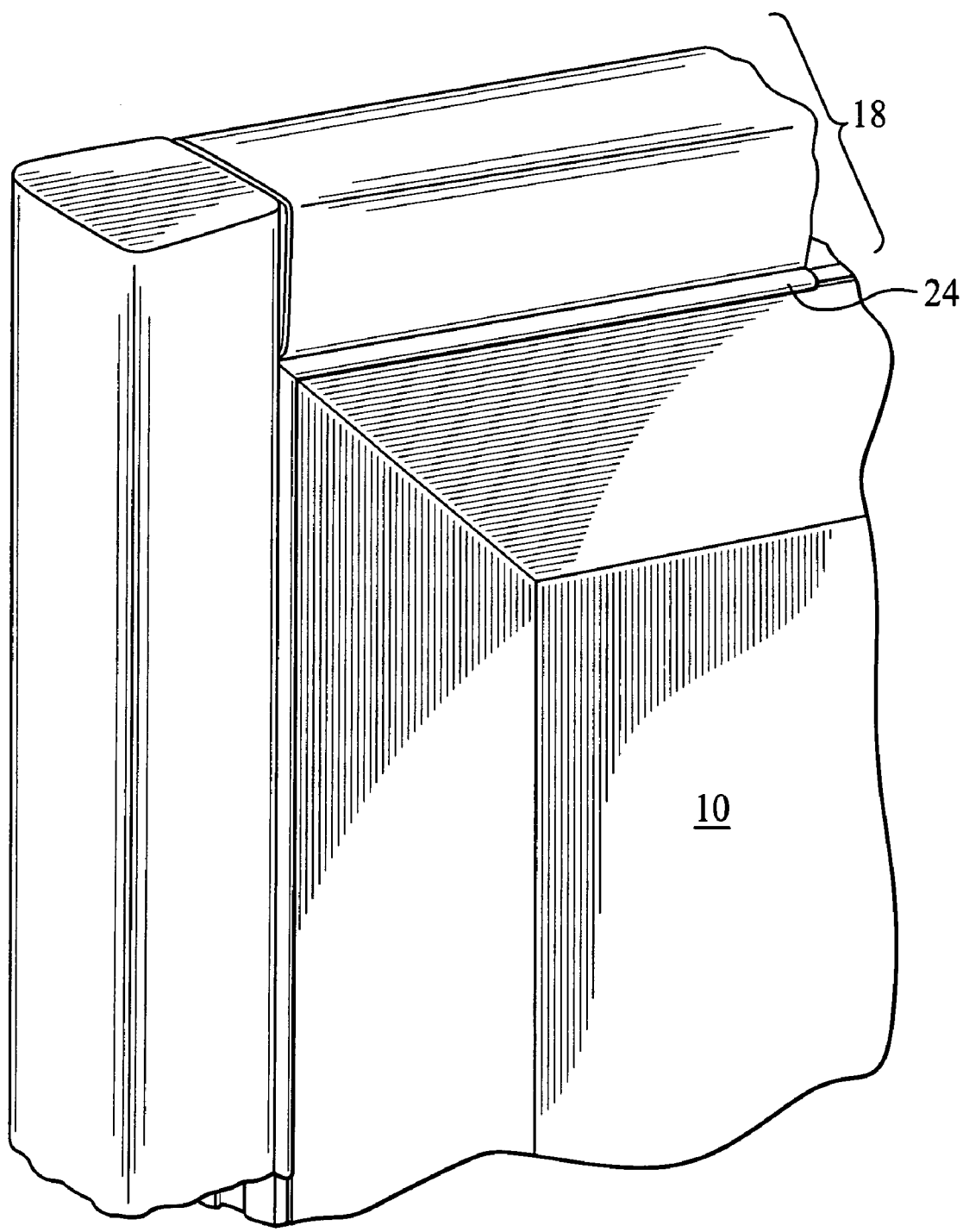
FIG. 10 is a partial perspective view of the upper-left edge of the panel of FIG. 1, fitted with foam-type seals.

The edge members 18 of FIG. 1 are shown and described in more detail in FIGS. 8–10. FIG. 8 depicts the receiving channels 20 formed in the peripheral edges of the bulkhead core 1. The mounting members 24 can be mitered together as shown in FIG. 9, whereby the seals 25 are permitted to effectively comb together 38 at the corner of the bulkhead.

Other known types of seals may be readily substituted for the wipe- or blade-type seal 25. For instance, vinyl-encased foam seals may be fastened to the mounting members 24 as shown in FIG. 10. Optionally, the wipes or foam may be secured to the mounting member without use of mechanical fasteners, as by heat sealing, gluing, or integral molding.

Significantly, the seals may be easily removed and replaced. The useful life of a bulkhead is often defined by the durability of the peripheral seals. When the seals tear or otherwise degrade, bacteria and other pathogens can infiltrate and subsist within the seal area, thereby greatly increasing the risk of food contamination. Moreover, worn out seals are unable to provide the required insulation between cargo compartments. Due to the difficulty in removing the seals from many previous designs, bulkheads are usually discarded when the seals are worn out. Contrariwise, the seals of the above-described embodiments may be readily removed and cost-effectively replaced with new seals.

The receiving channels 20 and mounting members 24 can fashioned to have virtually any set of complementary configurations. Hemispherical detents may be formed at the peripheral edge of the panels 10, 11 and the mounting members 24 may be adapted to include hemispherical protrusions so that the edge member 18 snaps on to the bulkhead core 1. Alternatively, horizontal ridges may be formed at the peripheral edges of the panels 10, 11 and complementary splines or ridges may be formed into the mounting members so that the side edge members 18 may slide laterally into place. Any combination of suitable formations, fasteners, and other known fastening means may be used to secure the edge member 18 to the bulkhead core 1.

Figure 11:
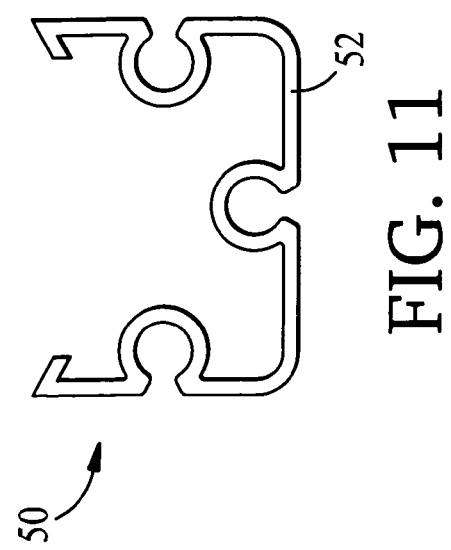
FIG. 11 is a cross sectional views of a metal edge member that can be integrally molded into the periphery of the panel.
Figure 12:
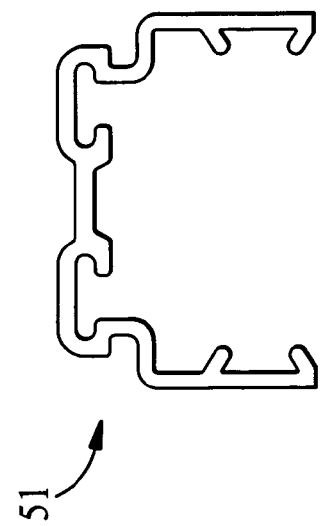
FIG. 12 is a cross sectional views of another metal edge member that can be integrally molded into the periphery of the panel.

FIGS. 11–12 depict trim members 50, 51 that can be integrally molded into the panel so that they form the outer edge of the panel. FIG. 12 shows a rigid trim member 51 that, after being integrally molded into the periphery of the bulkhead, serves as a rigid mount for the wipe seals and other edge members heretofore described. In such an embodiment, the trim member 51 effectively replaces the peripheral portion of the panel 10 that includes the integrally molded channels 20 (shown in FIG. 8). FIG. 11 shows another rigid trim member 50 that can be adapted to serve as a hinge plate. Hinges made of polymer, vinyl, fabric, rubber, metal or other suitable material can be connected to two proximally disposed rigid trim members. A polymeric or other suitable sheeting member can be laid across the face one trim member and then attached to the trim member by pushing a rod or post into the circular trim cavity. The sheeting member traverses the face 52 of the trim member 50 and then is attached in a like manner to an opposably facing trim member (on an adjacent panel) having the same construction. This arrangement holds the adjacent panel firmly but permits the adjacent panel to pivot through almost a complete 360 degree range.

Figure 13:
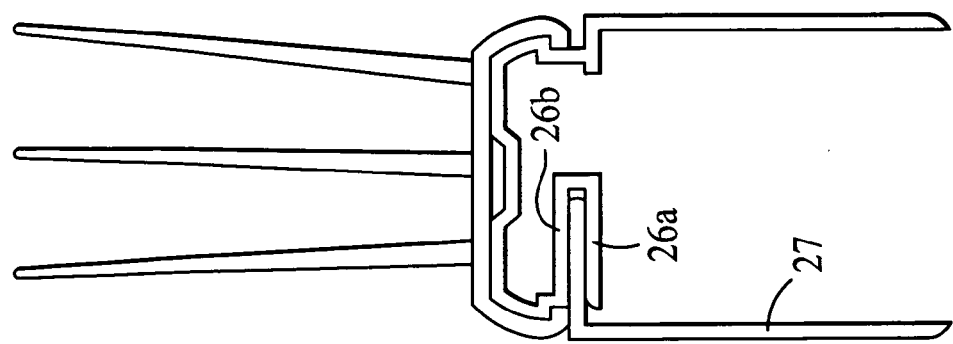
FIG. 13 is a cross sectional view of an adjustable seal that can be mounted to bulkhead and partition panels of varying widths.

FIG. 13 depicts an adjustable edge member comprised of two adjustable members, 26a, 26b which include receiving channels 20 that slideably engage with the previously described mounting members 24. Mounting flanges 27 are adapted to be secured to the bulkhead core 1. The adjustable members 26a and 26b of FIG. 13 slideably and reciprocally engage one another so as to permit the adjustable members 26 to be readily moved during manufacturing operation from an open position to a fully closed position (shown in FIG. 13). The adjustable members can be partially closed so as to accommodate bulkhead cores 1 of varying thicknesses. After the adjustable members 26a,b are closed to the desired thickness, the mounting flanges 27 are securing to the panels 10, 11 according to known means such as adhesives, mechanical fasteners, and the like.

A number of embodiments of the present invention have been described. Nevertheless, it will be understood that various additional modifications may be made without departing from the spirit and scope of the invention. Accordingly, other embodiments are within the scope of the following claims.

What is claimed is:

1. An apparatus for separating cargo areas, comprising:
   a panel having first and second faces and a peripheral edge extending between the first and second faces, at least a portion of the first and second faces being spaced apart and substantially parallel to one another;
   an insulative foam material disposed between the first face and the second face of the panel;
   a first handle formation in the panel, the first handle formation comprising a first pair of channels extending through the first and second faces of the panel; and
   a first handle member received by the first handle formation, the first handle member comprising a first strap that is fastenerlessly coupled to the panel and extends outwardly from the first face and second face of the panel.

2. The apparatus of claim 1, wherein the first handle member comprises a continuous loop that passes through the first pair of channels through the panel so as to extend outwardly from the first and second faces of the panel.

3. The apparatus of claim 1, further comprising:
   a second handle formation in the panel, the second handle formation comprising a second pair of channels extending through the first and second faces of the panel; and
   a second handle member received by the second handle formation, the second handle member comprising a second strap that is fastenerlessly coupled to the panel and extends outwardly from the first face and second faces of the panel.

4. The apparatus of claim 1, further comprising a seal member coupled to the peripheral edge of the panel, wherein the seal member comprises at least one of a polymeric blade and a foam seal.

5. The apparatus of claim 1, wherein the panel is a polymeric rotomolded seamless panel, the panel being integrally formed such that the peripheral edge surfaces are substantially seamless.

6. An apparatus for separating cargo areas, comprising:
   a panel having first and second faces and a peripheral edge extending between the first and second faces, at least a portion of the first and second faces being spaced apart and substantially parallel to one another;
   an insulative foam material disposed between the first face and the second face of the panel;
   a first handle formation in the panel, the first handle formation comprising a first pair of channels extending through the first and second faces of the panel;
   a first handle member received by the first handle formation, the first handle member comprising a first strap arranged in a loop that is coupled to the panel without the use of fasteners and extends outwardly from the first face and second face of the panel;
   a second handle formation in the panel, the second handle formation comprising a second pair of channels extending through the first and second faces of the panel;
   a second handle member received by the second handle formation, the second handle member comprising a second strap arranged in a loop that is coupled to the panel without the use of fasteners and extends outwardly from the first face and second face of the panel.

7. The apparatus of claim 6, wherein the first handle member comprises a first nylon strap arranged in a continuous loop that passes through the first pair of channels through the panel so as to extend outwardly from the first and second faces of the panel.

8. The apparatus of claim 7, wherein the second handle member comprises a second nylon strap arranged in a continuous loop that passes through the second pair of channels through the panel so as to extend outwardly from the first and second faces of the panel.

9. The apparatus of claim 8, wherein the panel receives the first and second straps without the use of fasteners so that the panel is substantially impervious to moisture.

10. The apparatus of claim 9, wherein a first portion of the first strap extends outwardly from said first face of the panel and an opposing second portion of the first strap member extends outwardly from the second face of the panel.

11. The apparatus of claim 9, further comprising a seal member coupled to the peripheral edge of the panel.

12. The apparatus of claim 11, wherein the seal member comprises at least one of a polymeric blade and a foam seal.

13. The apparatus of claim 12, wherein the seal member comprises a vinyl-encased foam seal.

14. The apparatus of claim 6, wherein the panel is a polymeric rotomolded seamless panel, the panel being integrally formed such that surfaces of the peripheral edge are substantially seamless.

15. The apparatus of claim 6, wherein the first and second faces comprises resinous walls having a wall thickness of 0.05 inches to 0.5 inches.

16. The apparatus of claim 15, wherein the insulative foam material fills between the resinous walls so as to increase the rigidity and strength of the panel.

17. The apparatus of claim 1, wherein the panel fastenerlessly receives the first strap so that the panel is substantially impervious to moisture.

18. The apparatus of claim 17, wherein a first portion of the first strap extends outwardly from said first face of the panel and an opposing second portion of the first strap member extends outwardly from the second face of the panel.

19. The apparatus of claim 1, wherein the first and second faces comprises resinous walls having a wall thickness of 0.05 inches to 0.5 inches.

20. The apparatus of claim 19, wherein the insulative foam material fills between the resinous walls so as to increase the rigidity and strength of the panel.

* * * * *